United States Patent
Lee

(10) Patent No.: US 10,938,675 B2
(45) Date of Patent: Mar. 2, 2021

(54) DYNAMIC NEGOTIATION MODELS IN SOFTWARE-DEFINED NETWORKS

(71) Applicant: Futurewei Technologies, Inc., Plano, TX (US)

(72) Inventor: Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 141 days.

(21) Appl. No.: 15/943,401

(22) Filed: Apr. 2, 2018

(65) Prior Publication Data
US 2019/0306033 A1 Oct. 3, 2019

(51) Int. Cl.
G06F 15/16 (2006.01)
H04L 12/24 (2006.01)

(52) U.S. Cl.
CPC ...... H04L 41/5045 (2013.01); H04L 41/5048 (2013.01)

(58) Field of Classification Search
CPC ............ H04L 41/5045; H04L 41/5048
See application file for complete search history.

(56) References Cited

U.S. PATENT DOCUMENTS

| | | | | |
|---|---|---|---|---|
| 7,415,435 B1* | 8/2008 | Weiss | ...... | G06Q 30/06 705/35 |
| 8,213,433 B2* | 7/2012 | Zhang | ...... | H04L 47/2425 370/395.21 |
| 8,533,103 B1* | 9/2013 | Certain | ...... | G06Q 10/06 705/37 |
| 8,612,330 B1* | 12/2013 | Certain | ...... | G06Q 30/06 705/37 |
| 8,694,400 B1* | 4/2014 | Certain | ...... | G06Q 30/08 705/35 |
| 9,094,299 B1* | 7/2015 | Rao | ...... | H04L 41/0813 |
| 10,248,974 B2* | 4/2019 | Firth | ...... | G06Q 30/0275 |
| 10,554,578 B2* | 2/2020 | Karthikeyan | ...... | H04L 47/24 |

(Continued)

FOREIGN PATENT DOCUMENTS

| | | |
|---|---|---|
| CN | 103139104 A | 6/2013 |
| CN | 107689942 A | 2/2018 |

OTHER PUBLICATIONS

Machine Translation and Abstract of Chinese Publication No. CN107689942, Feb. 13, 2018, 22 pages.

(Continued)

*Primary Examiner* — Douglas B Blair
(74) *Attorney, Agent, or Firm* — Conley Rose, P.C.

(57) ABSTRACT

A method of negotiating services. The method includes transmitting a service request to a provider device. The service request includes a base level of service at a base cost and alternative levels of service each at an alternative cost. Each of the alternative levels of service includes an alternative service parameter that has been downgraded relative to a corresponding base level service parameter. The alternative cost is less than the base cost. The method includes receiving a confirmation message from the provider device. The confirmation message indicates whether the base level of service or an alternative level of service has been accepted by the provider device. The method also includes receiving data at the base level of service or at the one of the one or more negotiated levels of service in accordance with the confirmation message.

11 Claims, 13 Drawing Sheets

(56) References Cited

U.S. PATENT DOCUMENTS

| | | | |
|---|---|---|---|
| 2003/0097443 A1* | 5/2003 | Gillett | H04L 29/06 709/225 |
| 2005/0243755 A1 | 11/2005 | Stephens | |
| 2008/0300942 A1* | 12/2008 | Boss | G06Q 10/06315 705/7.25 |
| 2008/0301017 A1* | 12/2008 | Dawson | G06Q 40/00 705/35 |
| 2010/0114554 A1* | 5/2010 | Misra | G06Q 10/00 703/22 |
| 2010/0125486 A1* | 5/2010 | Sinclair | G06Q 10/08 705/7.31 |
| 2011/0185041 A1* | 7/2011 | Hunt | H04L 65/1069 709/219 |
| 2013/0035060 A1* | 2/2013 | Chan | H04L 12/145 455/406 |
| 2014/0286160 A1 | 9/2014 | Zhang et al. | |
| 2016/0330083 A1* | 11/2016 | Djukic | H04L 41/5006 |
| 2017/0243268 A1* | 8/2017 | Fukuda | G06Q 30/0611 |
| 2017/0265063 A1* | 9/2017 | Xie | H04L 29/08 |

OTHER PUBLICATIONS

Foreign Communication From a Counterpart Application, PCT Application No. PCT/CN2019/080305, English Translation of International Search Report dated Jun. 14, 2019, 5 pages.

Foreign Communication From a Counterpart Application, PCT Application No. PCT/CN2019/080305, English Translation of Written Opinion dated Jun. 14, 2019, 5 pages.

Bjorklund, Ed., "Yang—a Data Modeling Language for the Network Configuration Protocol (NETCONF)," RFC 6020, Oct. 2010, 173 pages.

Enns, Ed., et al., "Network Configuration Protocol (NETCONF)," RFC 6241, Jun. 2011, 113 pages.

Bierman, et al., "Restconf Protocol," RFC 8040, Jan. 2017, 137 pages.

* cited by examiner

WHERE LATENCY CAN BE
RELAXED WHILE B/W
CANNOT BE RELAXED
700

|  | LATENCY | LATENCY VARIATION | RES. B/W | PROTECTION | COST |
|---|---|---|---|---|---|
| BASE LEVEL 702 | <= t1 | <= dt1 | B0 | 1+1 | 1 |
| NEGOTIATION OPTION 1 704 | <= t1+t2 | <= dt1 | B0 | 1+1 | 0.9 |
| NEGOTIATION OPTION 2 706 | <= t1+t2+t3 | <= dt1+dt2 | B0 | 1+1 | 0.8 |
| ⋮ | ⋮ | ⋮ | ⋮ | ⋮ | ⋮ |

Column headers labeled 708.

FIG. 7

WHERE LATENCY IS
MAINTAINED WHILE
B/W MAY BE RELAXED
800

|  | LATENCY | LATENCY VARIATION | RES. B/W | PROTECTION | COST |
|---|---|---|---|---|---|
| BASE LEVEL 802 | <= t1 | <= dt1 | B0 | 1+1 | 1 |
| NEGOTIATION OPTION 1 804 | <= t1 | <= dt1 | B0-B1 | 1+1 | 0.7 |
| NEGOTIATION OPTION 2 806 | <= t1 | <= dt1 | B0-B1-B2 | 1+1 | 0.5 |
| ⋮ | ⋮ | ⋮ | ⋮ | ⋮ | ⋮ |

Column headers labeled 808.

YANG MODEL
1400

```
module ietf-te-negotiation {
  namespace "urn:ietf:params:xml:ns:yang:ietf-te-negotiation";
  prefix "tn";
  organization
    "IETF Traffic Engineering Architecture and Signaling (TEAS)
    Working Group";
  contact
    "Editor: Young Lee <leeyoung@huawei.com>";
  description
    "This module contains a YANG module for negotiation model for VN
and TE.";

revision 2018-01-05 {
    description
      "initial version.";
    reference
      "TBD";
  }
  typedef protection-type {
    type enumeration {
      enum "1+1" {
        description
          "1+1";
      }
      enum "1+shared" {
        description
          "1+shared";
      }
                   enum "no_protection" {
        description
          "no_protection";
      }
    }
    description
      "protection type";
  }
```

FIG. 14B

YANG MODEL 1400

```
/*
 * Configuration data nodes
 */
container negotiation {
  description
    "Negotiation Level and its parameters are described";

list negotiation-list {
    key "negotiation-level-id";
    description
      "Negotiation level identified via a level-id";
    leaf negotiation-level id {
      type unit32;
      description
        "a unique negotiation level identifier";
    }
    leaf latency {
      type unit32;
      description
        "Latency";
    }
    leaf latency-variation {
      type unit32;
      description
        "Latency Variation";
    }
    leaf bandwidth {
      type unit32;
      description
        "bandwidth";
    }
    leaf protection-level {
      type protection-type;
      description
        "protection level";
    }
    leaf cost {
      type unit32;
      description
        "cost";
    }
  {
}
```

FIG. 14C

YANG MODEL
1400

```
/*
 * Operational data nodes
 */ container negotiation-selection {
  config false;

description
    "Selected Negotiation Level and its parameters are described";

leaf negotiation-level-id {
      type unit32;
      description
        "selected negotiation level identifier";
    }
    leaf latency {
      type unit32;
      description
        "Latency";
    }
    leaf latency-variation {
      type unit32;
      description
        "Latency Variation";
    }
    leaf bandwidth {
      type unit32;
      description
        "bandwidth";
    }
    leaf protection-level {
      type protection-type;
      description
        "protection level";
    }
    leaf cost {
      type unit32;
      description
        "cost";
    }
  {
}
```

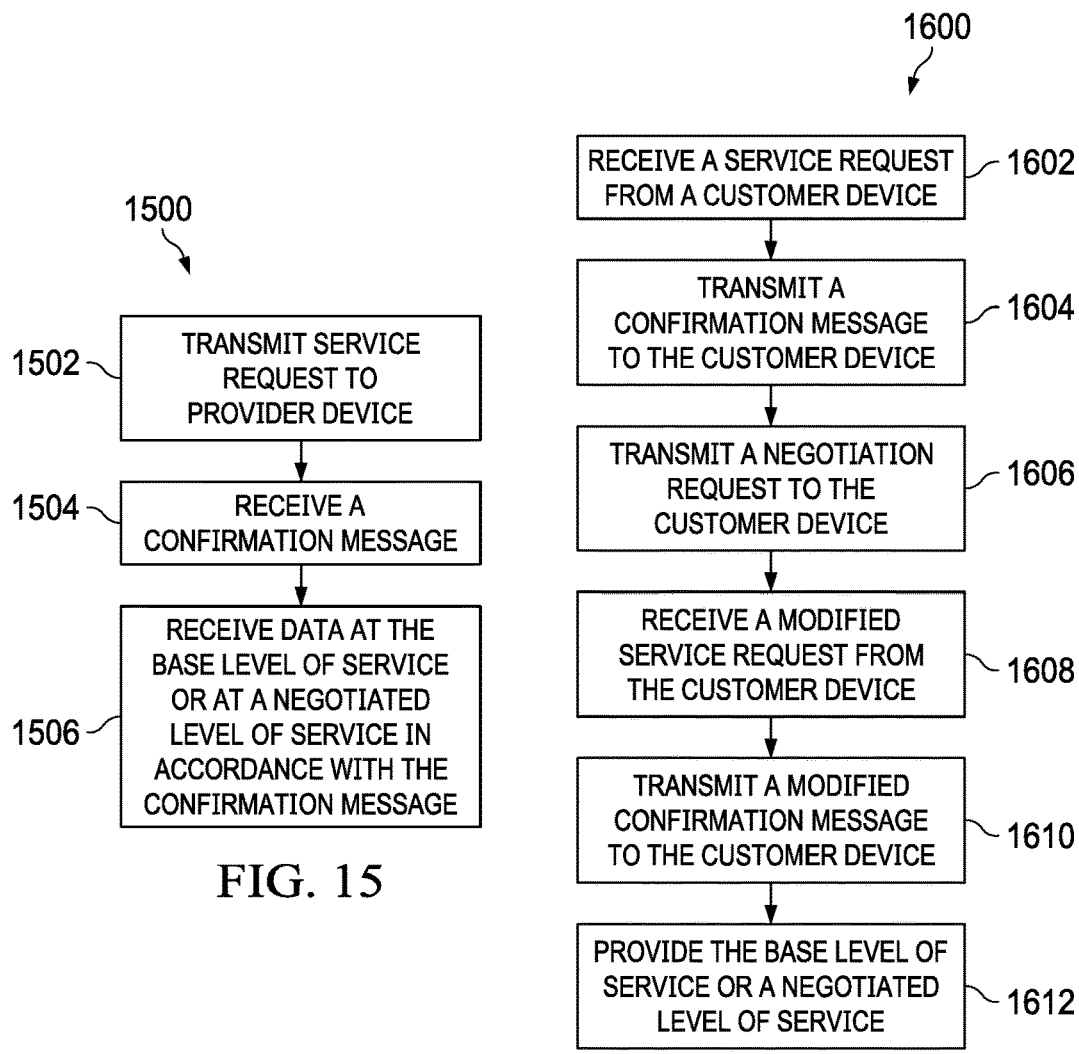
FIG. 15
FIG. 16
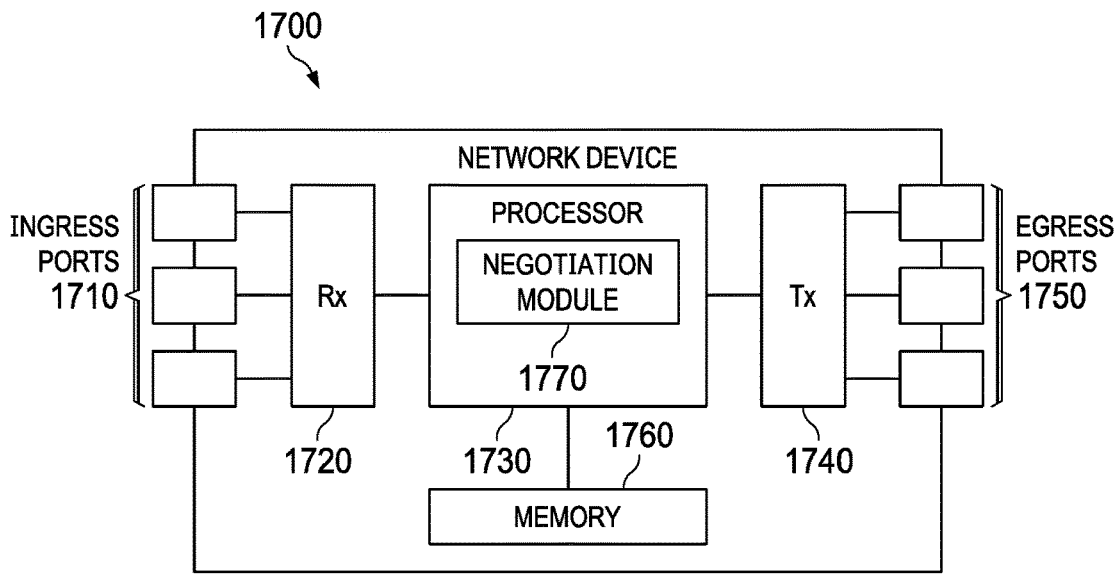
FIG. 17

DYNAMIC NEGOTIATION MODELS IN SOFTWARE-DEFINED NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software-defined networks (SDNs) have emerged as a promising technology. In SDNs, network control is decoupled from forwarding and is programmable, for example, by separating the control plane from the data plane and implementing the control plane using software applications and a centralized SDN controller, which may make routing decisions and communicate the routing decisions to all the network devices on the network. This migration from tightly bound individual network device control to control using accessible computing devices has enabled the underlying infrastructure to be abstracted for applications and network services, permitting treatment of the network as a logical entity.

SUMMARY

According to one aspect of the present disclosure, there is provided a method of negotiating services implemented by a customer device. The method includes transmitting a service request to a provider device, wherein the service request includes a base level of service at a base cost and one or more negotiated levels of service each at an alternative cost, wherein each of the one or more alternative levels of service includes an alternative service parameter that has been downgraded relative to a corresponding base level service parameter, and wherein the alternative cost is less than the base cost; receiving a confirmation message from the provider device in response to the service request, wherein the confirmation message indicates that the base level of service has been accepted by the provider device when the base level of service is available, and wherein the confirmation message indicates that one of the one or more alternative levels of service has been accepted by the provider device when the base level of service is not available; and receiving data at the base level of service or at the one of the one or more alternative levels of service in accordance with the confirmation message.

Optionally, in any of the preceding aspects, another implementation of the aspect provides for renegotiating use of the base level of service or the one of the one or more alternative levels of service for each subsequent service request that commences a new transaction.

Optionally, in any of the preceding aspects, another implementation of the aspect provides that the one or more alternative levels of service and the alternative cost for each are determined by the customer device.

Optionally, in any of the preceding aspects, another implementation of the aspect provides that the base level of service and the one or more alternative levels of service include one or more of a latency parameter, a latency variation parameter, a reserved bandwidth parameter, and a protection parameter.

Optionally, in any of the preceding aspects, another implementation of the aspect provides that the service request and the confirmation message conform to one of a Path Computation Element (PCE) Communication Protocol (PCEP).

Optionally, in any of the preceding aspects, another implementation of the aspect provides that the service request and the confirmation message conform to a RestConf protocol or a NetConf protocol.

Optionally, in any of the preceding aspects, another implementation of the aspect provides that a negotiation level flag in the service request indicates how many of the one or more alternative levels of service are available to be accepted.

Optionally, in any of the preceding aspects, another implementation of the aspect provides that a negotiation level flag in the confirmation message indicates which of the one or more alternative levels of service has been accepted by the provider device.

Optionally, in any of the preceding aspects, another implementation of the aspect provides for receiving a billing notification message from a billing server, wherein the billing notification message indicates whether the customer device is being billed for the base level of service or the one of the one or more alternative levels of service.

According to one aspect of the present disclosure, there is provided a method of negotiating services implemented by a provider device. The method includes receiving a service request from a customer device, wherein the service request includes a base level of service; transmitting a confirmation message to the customer device to accept the service request when the base level of service is available; transmitting a negotiation request to the customer device when the base level of service is not available, wherein the negotiation request includes one or more alternative levels of service each having an alternative cost, wherein each of the alternative levels of service includes an alternative service parameter that has been downgraded relative to a corresponding base level service parameter, and wherein each alternative cost is less than a base cost for the base level of service; receiving a modified service request from the customer device in response to the negotiation request, wherein the modified service request contains a selection of one of the alternative levels of service; transmitting a modified confirmation message to the customer device to accept the modified service request; and providing the base level of service to the customer device when the base level of service is available and providing the one of the alternative levels of service to the customer device according to the selection when the base level of service is not available.

Optionally, in any of the preceding aspects, another implementation of the aspect provides for transmitting an outcome message to a billing server, wherein the outcome message indicates whether the customer device will receive the base level of service or the one of the alternative levels of service.

Optionally, in any of the preceding aspects, another implementation of the aspect provides for communicating with a network resource database to determine whether the base level of service is available and whether any of the one or more alternative levels of service are available when the base level of service is not available.

Optionally, in any of the preceding aspects, another implementation of the aspect provides for communicating with the network resource database to determine the alternative cost of the one or more alternative levels of service when the base level of service is not available.

Optionally, in any of the preceding aspects, another implementation of the aspect provides that a negotiation level flag in the negotiation request indicates how many of the alternative levels of service are available to be accepted.

Optionally, in any of the preceding aspects, another implementation of the aspect provides that a negotiation level flag in the modified service request indicates which of the alternative levels of services was accepted by the customer device.

Optionally, in any of the preceding aspects, another implementation of the aspect provides that the modified service request includes the alternative service parameter.

According to one aspect of the present disclosure, there is provided a customer device configured to negotiate services. The customer device includes a transmitter configured to transmit a service request to a provider device, wherein the service request includes a base level of service at a base cost and a plurality of alternative levels of service each having an alternative cost, wherein each of the alternative levels of service includes an alternative service parameter that has been downgraded relative to a corresponding base level service parameter, and wherein the alternative cost is less than the base cost; a receiver coupled to the transmitter, the receiver configured to receive a confirmation message from the provider device in response to the service request, wherein the confirmation message indicates that the base level of service has been accepted by the provider device when the base level of service is available, and wherein the confirmation message indicates that one of the alternative levels of service has been accepted by the provider device when the base level of service is not available but the one of the alternative levels of service is available; and a processor coupled to the receiver, the processor configured to process data received by the receiver at the base level of service or at the one of the alternative levels of service in accordance with the confirmation message.

Optionally, in any of the preceding aspects, another implementation of the aspect provides that the alternative levels of service and the alternative cost are determined by the customer device.

Optionally, in any of the preceding aspects, another implementation of the aspect provides that a negotiation level flag in the confirmation message indicates which of the plurality of alternative levels of service has been selected by the provider device.

Optionally, in any of the preceding aspects, another implementation of the aspect provides that the confirmation message includes the alternative service parameter.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is an embodiment of a service listing that may be used within the provider-initiated negotiation model of FIG. 5 or within the customer-initiated negotiation model of FIG. 6.

FIG. 8 is an embodiment of a service listing that may be used within the provider-initiated negotiation model of FIG. 5 or within the customer-initiated negotiation model of FIG. 6.

FIGS. 14A-C collectively illustrate an embodiment of a Yang model.

FIG. 15 is a flowchart of an embodiment of a method of negotiating services.

FIG. 16 is a flowchart of an embodiment of a method 1500 of negotiating services.

FIG. 17 is a schematic diagram of an embodiment of a network device.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Although the SDN model provides numerous benefits, there are some instances where a network provider cannot meet a customer's initial service request to establish a virtual network (VN) or to provide connectivity because there are not sufficient resources available. Therefore, the opportunity for the network to serve the customer's initial service request is lost at the point of the service request.

Disclosed herein are dynamic negotiation models suitable for use in the context of SDNs. As will be more fully explained below, the models allow for further negotiations on network resources between the network provider and the customer when the network provider is unable to meet the customer's initial service request to establish a VN or to provide connectivity. By utilizing the negotiation models disclosed herein, the opportunity for the network to serve the customer's initial service request is no longer lost at the point of the service request.

While the negotiation models disclosed herein are described generally in the terms of a hierarchical network in the context of an SDN, it should be recognized that the negotiation models are applicable to any network with a client-server interface such as, for example, an SDN implementing a Northbound Interface (NBI) or an Abstraction and Control of Traffic-Engineered (TE) Network (ACTN) implementing a Customer Network Controller (CNC)—Multi Domain Service Coordinator (MDSC) Interface (CMI), and so on.

Figure 1:
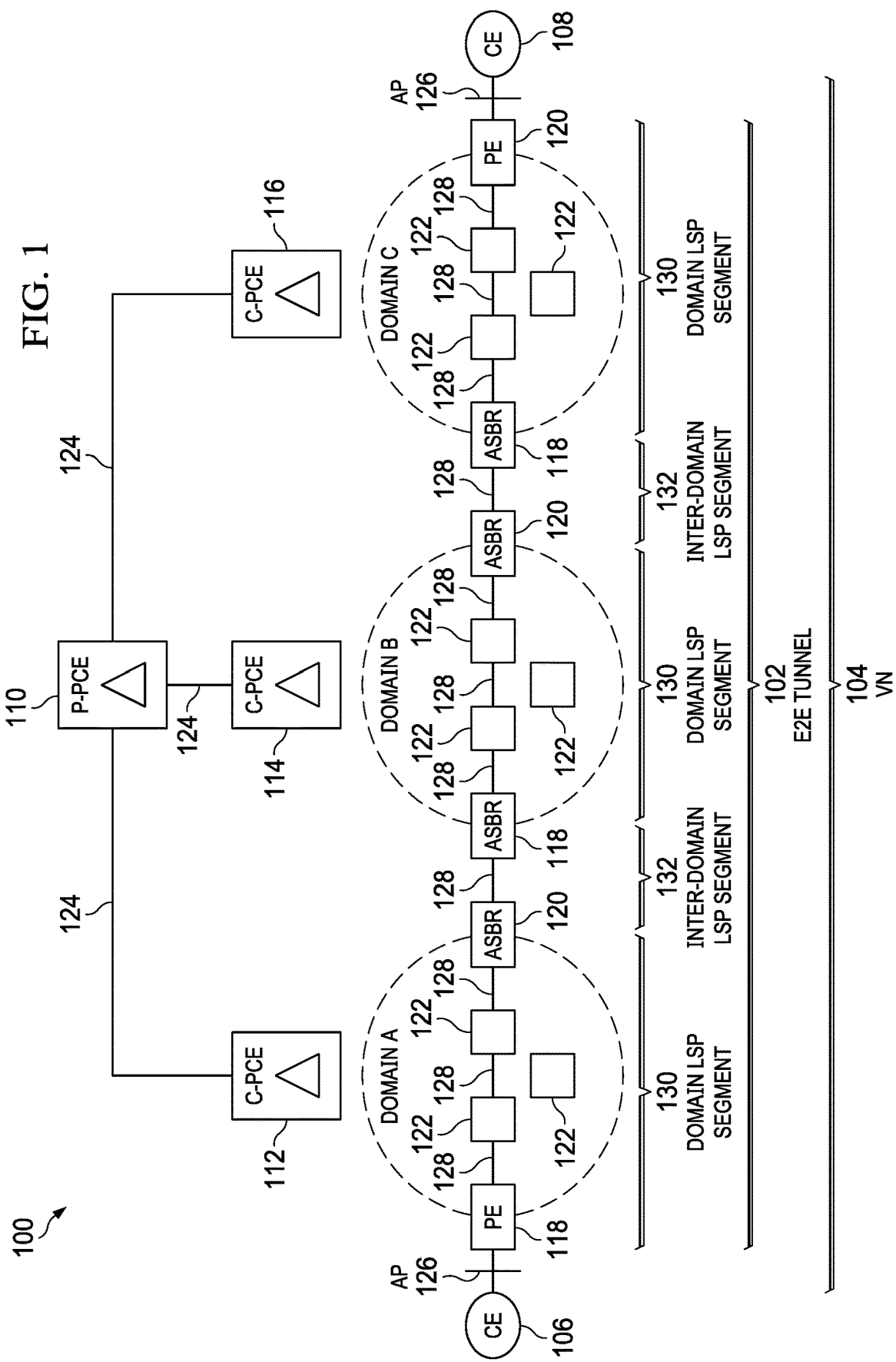
FIG. 1 is a schematic diagram of an embodiment of an SDN-based network.

FIG. 1 is an embodiment of a hierarchical network 100 suitable for creating an E2E tunnel 102 for a VN 104 passing through multiple domains, such as domain A, domain B, and domain C, and extending from one endpoint 106 (e.g., a source) to another endpoint 108 (e.g., a destination). As used herein, each of the endpoints may be referred to as a customer edge (CE). As shown, the hierarchical network 100 includes a central controller 110, child controllers 112, 114, 116, ingress network elements 118, egress network elements 120, and intermediate network elements 122.

The central controller 110 is the network element responsible for managing the child controllers 112, 114, 116, which are below the central controller 110 in the hierarchy of the hierarchical network 100. For purposes of illustration, in FIG. 1 the central controller 110 is depicted as a child path computation element (P-PCE) operating in a PCEP context. However, in an embodiment the central controller 110 may also be an MDSC operating in the ACTN context. The central controller 110 may be coupled to the child controllers 112, 114, 116 via a link 124 comprising a wired connection, a wireless connection, or some combination thereof.

The child controllers 112, 114, 116 are the network elements each responsible for managing one of the domains through which the E2E tunnel 102 passes. In FIG. 1, child controller 112 is responsible for managing domain A, child controller 114 is responsible for managing domain B, and child controller 116 is responsible for managing domain C. While three child controllers 112, 114, 116 are depicted in FIG. 1, it should be understood that more or fewer child controllers may be included in the hierarchical network 100 in practical applications. For purposes of illustration, in FIG. 1 the child controllers 112, 114, 116 are depicted as a C-PCE operating in the PCEP context. However, in an embodiment the child controllers 112, 114, 116 may also be a provider network controller (PNC) in the ACTN context. One or more of the controllers disclosed herein (e.g., central controller 110 and child controllers 112, 114, 116) may be referred to as a stateful controller (e.g., a stateful PCE).

The child controllers 112, 114, 116 are coupled to ingress network elements 118, egress network elements 120, and any intermediate network elements 122 in their respective domains A, B, C via a link (not shown) comprising a wired connection, a wireless connection, or some combination thereof. In an embodiment, one or both of the ingress network element 118 and the egress network element 120 is an Autonomous System Boundary Router (ASBR).

The ingress network element 118 in domain A coupled to the endpoint 106 at the start of the E2E tunnel 102 may be referred to as a PE or simply a provider. Likewise, the egress network element 120 in domain C coupled to the endpoint 108 at the end of the E2E tunnel 102 may also be referred to as a PE. As shown in FIG. 1, an access point (AP) interface 126 is disposed between the endpoint 106 and the ingress network element 118 of domain A. Another AP interface 126 is disposed between the egress network element 120 of domain C and the endpoint 108.

Using some combination of ingress network elements 118, one or more intermediate network elements 122 (optional), and egress network elements 120, a path 128 (e.g., a Label-switched Path (LSP)) may be established. The portion of the path 128 disposed within a domain (e.g., within domain A, within domain B, and within domain C) may be referred to as an intra-domain segment 130. The portion of the path 128 disposed between domains (e.g., between domain A and domain B, and between domain B and domain C) may be referred to as an inter-domain segment 132. As will be discussed more fully below, the path 128 is utilized to transmit data packets through the hierarchical network 100.

Figure 2:
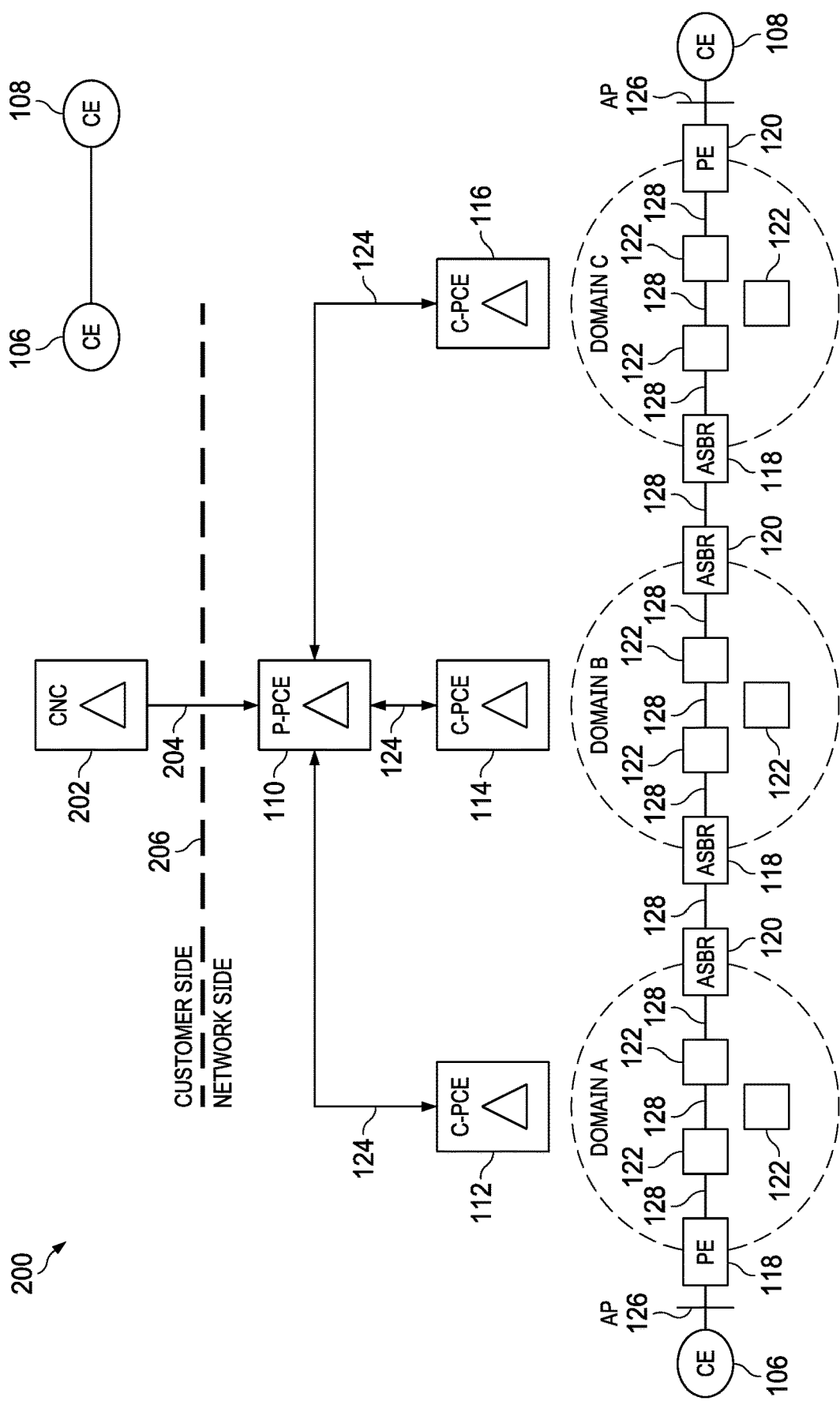
FIG. 2 is a schematic diagram of another embodiment of an SDN-based network.

FIG. 2 is a schematic diagram of another embodiment of a hierarchical network 200. The hierarchical network 200 of FIG. 2 is similar to the hierarchical network 100 of FIG. 1. As shown in FIG. 2, a CNC 202 is coupled to the central controller 110 via link 204. Link 204 may be a wired connection, a wireless connection, or some combination thereof. The CNC 202 is disposed on a customer side of interface 206 and the central controller 110 is disposed on a network side of the interface 206. As such, the CNC 202 is managed by a customer while the central controller 110 is managed by a network administrator.

When the customer requests a service (e.g., requests that VN be created from one endpoint 106 to the other endpoint 108), the CNC 202 sends a request to the central controller 110. In an embodiment, the request is to establish an E2E tunnel 102 for the VN 104 extending across multiple domains (e.g., domains A, B, C) as shown in FIG. 1. In an embodiment, the request includes a virtual network identifier (VN ID) and an AP ID. When the central controller 110 receives the request from the CNC 202, the central controller 110 maps the VN ID and the AP ID to determine the ingress network element 118 (e.g., the PE) coupled to the endpoint 106 and the egress network element 120 (e.g., the PE) coupled to the endpoint 108 associated with the E2E tunnel 102 in FIG. 1 that the customer has requested.

After the ingress network element 118 and the egress network element 120 have been determined, the central controller 110 determines the domain sequence for the E2E tunnel 102 based on network topology information. The domain sequence is the series of domains that will be used to create the VN 104 requested by the customer and connect one endpoint 106 to the other endpoint 108. Thereafter, the central controller 110 configures the domain-level LSP.

Disclosed herein are dynamic negotiation models used in the context of an SDN-based system such as the hierarchical networks 100, 200 of FIGS. 1-2. As will be more fully explained below, the negotiation models permit further negotiation regarding network resources between a customer (e.g., the CNC 200 of FIG. 2) and a provider (e.g., the P-PCE 110 of FIGS. 1-2) when the provider is unable to meet the customer's initial service request for a VN (e.g., the VN 104 of FIG. 1) or connectivity. Without the negotiation models, the opportunity for a network (e.g., the hierarchical networks 100, 200 of FIGS. 1-2) to serve the customer's request is lost at the point of the service request when the provider does not currently have sufficient network resources to meet the customer's service requirements. Indeed, present networks do not include any mechanism that permits dynamic negotiation models in SDN networks.

Figure 3:
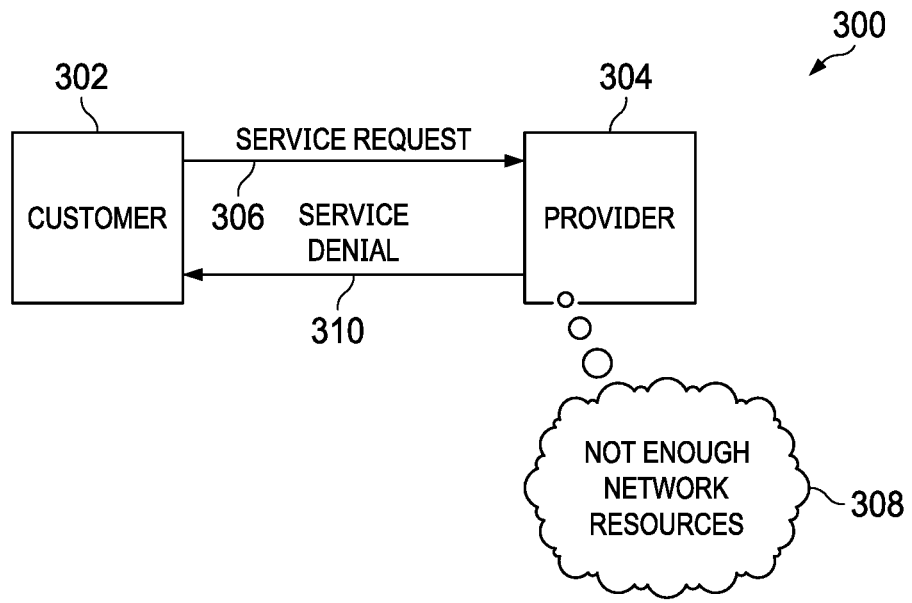
FIG. 3 is a simplified schematic diagram of an SDN-based network.

FIG. 3 is a simplified schematic of an SDN-based network 300. The SDN-based network 300 is similar to the hierarchical networks 100, 200 of FIGS. 1-2. The SDN-based network 300 includes a customer 302 (e.g., the CNC 200 of FIG. 2) and a provider 304 (e.g., the P-PCE 110 of FIGS. 1-2). As shown, the customer 302 transmits a service request 306 to the provider 304. The service request 306 may request that the provider 304 establish, for example, a VN 104 as shown in FIG. 1. Unfortunately, the provider 304 in FIG. 3 does not currently have sufficient network resources 308 available to satisfy the service request 306. Therefore, the provider 304 transmits a service denial 310 to the customer 302 indicating that the service requested by the customer 302 cannot be established. As such, the opportunity for the SDN-based network 300 to serve the customer's initial service request 302 is lost at the point of the service request 306.

Figure 4:
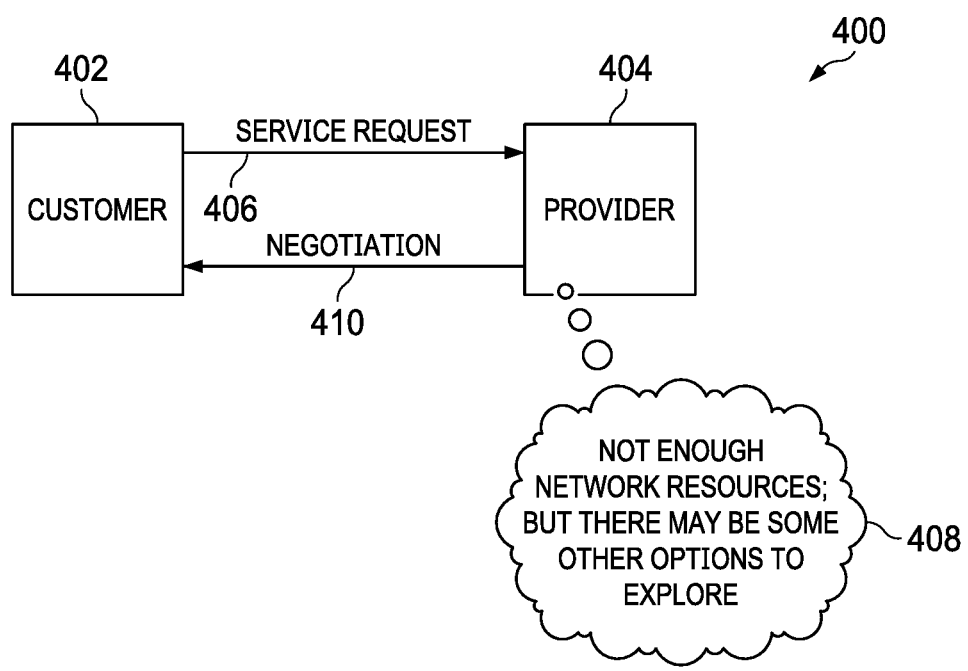
FIG. 4 is an embodiment of a simplified schematic diagram of an SDN-based network implementing a negotiation model.

FIG. 4 is an embodiment of a simplified schematic of an SDN-based network 400. The SDN-based network 400 is similar to the hierarchical networks 100, 200 of FIGS. 1-2 and the SDN-based network of FIG. 3. The SDN-based network 400 includes a customer 402 (e.g., the CNC 200 of FIG. 2) and a provider 404 (e.g., the P-PCE 110 of FIGS. 1-2). As shown, the customer 402 transmits a service request 406 to the provider 404. The service request 406 may request that the provider 404 establish, for example, a VN 104 as shown in FIG. 1. Similar to the provider in FIG. 3, the provider 404 in FIG. 4 does not currently have sufficient network resources 408 available to satisfy the service request 406. However, instead of transmitting a service denial 310 as shown in FIG. 3, the provider 404 transmits a negotiation message 410 to the customer 402 indicating that the VN 104 as requested by the customer 302 cannot be established but that there may be other options that may be explored. Therefore, there may yet be an opportunity for the SDN-based network 400 to serve the customer 402, albeit with a revised, modified, or alternative level of service, which is referred to herein as a negotiated level of service. As will be more fully explained below, in some embodiments the negotiation for services may be initiated by a provider and in some embodiments the negotiation for services may be initiated by a customer (a.k.a., the client).

Figure 5:
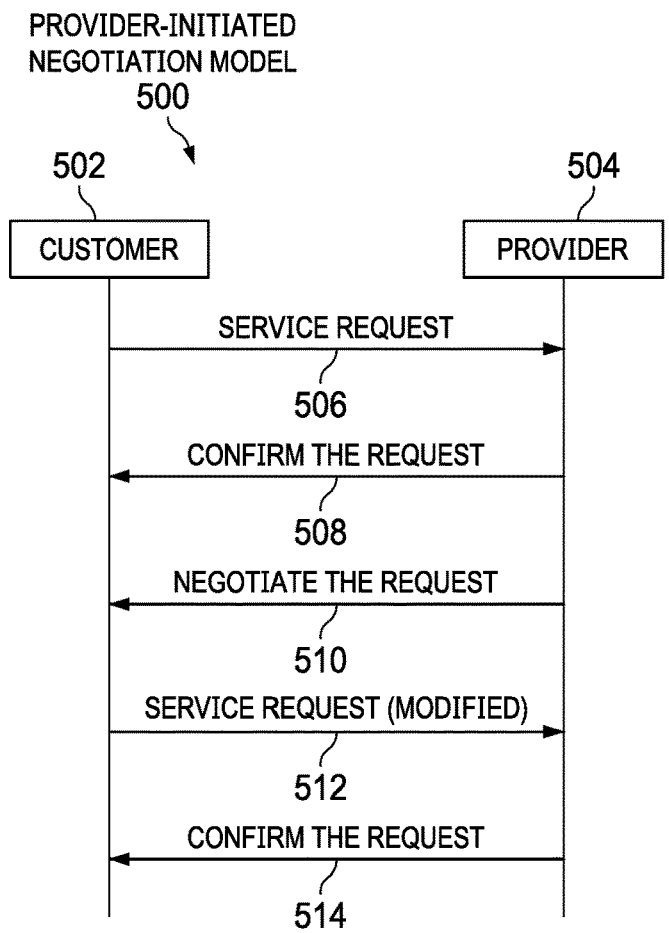
FIG. 5 is an embodiment of a provider-initiated negotiation model that may be used to negotiate services.

FIG. 5 is an embodiment of a provider-initiated negotiation model 500 that may be used to negotiate services. The provider-initiated negotiation model 500 includes a customer 502 and a provider 504. The customer 502 and the provider 504 in FIG. 5 are similar to the customer 402 and the provider 404 in FIG. 4. As shown, the customer 502 transmits a service request 506 to the provider 504. The service request 506 may be, for example, a request for a VN such as the VN 104 of FIG. 1. In an embodiment, the service request 506 indicates or identifies a base level of service and a base cost. The base level of service may be a minimum level of service, a desired level of service, or some other metric for the service. By way of example, and as will be more fully explained below, the base level of service may indicate that the requested service must have a latency of less than one millisecond (1 ms) at a base cost of one (1). In an embodiment, the base cost represents a monetary cost such as a cost in dollars.

Upon receiving the service request 506, the provider 504 makes a determination of whether the base level of service in the service request 506 can be satisfied based on the network resources currently available. For example, the provider 504 assesses, polls, or otherwise checks the network resources (e.g., the child controllers 112, 114, 116, ingress network elements 118, egress network elements 120, and intermediate network elements 122, etc., in FIG. 1) to determine whether the base level of service in the service request 506 can be achieved.

When the base level of service is available, the provider 504 transmits a confirmation message 508 to the customer 502 device to accept the service request 506. Thereafter, the service is established for the customer 502 in accordance with the service request 506 (e.g., at the base level or higher).

When the base level of service is not available, the provider 504 transmits a negotiation request 510 to the customer 502 device. In an embodiment, the negotiation request 510 includes one or more negotiated levels of service each having a negotiated cost. Each of the negotiated levels of service includes a negotiated service parameter that has been downgraded or relaxed relative to a corresponding base level service parameter. In addition, each negotiated cost is less than the base cost for the base level of service. By way of example, and as will be more fully explained below, the negotiated levels of service may indicate that the service can be provided at a latency of less than two milliseconds (2 ms) at a cost of 0.9, at a latency of less than three milliseconds (3 ms) at a cost of 0.8, or at a latency of less than five milliseconds (5 ms) at a cost of 0.5.

In response to the negotiation request 510, the customer 502 transmits a modified service request 512 to the provider 504. In an embodiment, the modified service request 512 contains a selection of one of the negotiated levels of service provided in the negotiation request 510. For example, the modified service request 512 may indicate that a service having a latency of less than two milliseconds (2 ms) at a cost of 0.9 has been selected. After receiving the modified service request 512 from the customer 502, the provider 504 transmits a modified confirmation message 514 to the customer 502 to accept the modified service request 512. Thereafter, the service is established for the customer 502 in accordance with the modified service request 512 (e.g., at the negotiated level and the negotiated cost that was selected).

Figure 6:
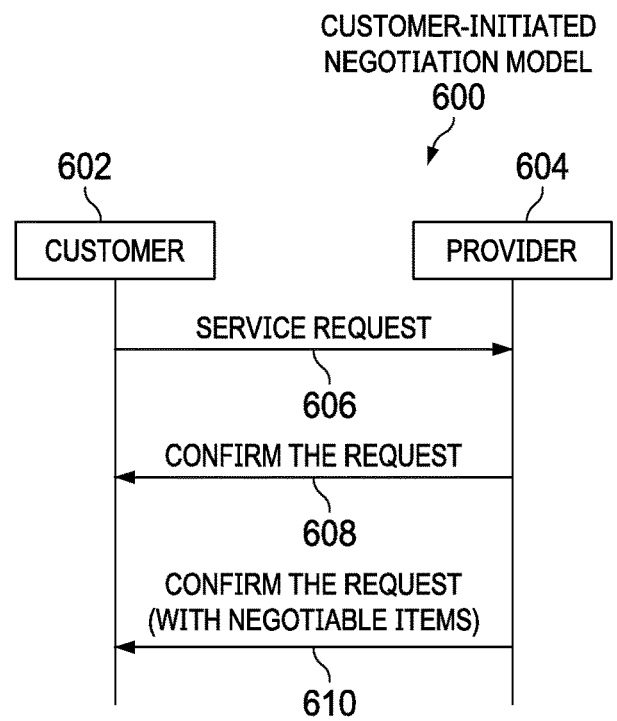
FIG. 6 is an embodiment of a customer-initiated negotiation model that may be used to negotiate services.

FIG. 6 is an embodiment of a customer-initiated negotiation model 600 that may be used to negotiate services. The customer-initiated negotiation model 600 includes a customer 602 and a provider 604. The customer 602 and the provider 604 in FIG. 6 are similar to the customer 402, 502 and the provider 404, 504 in FIGS. 4-5. As shown, the customer 602 transmits a service request 606 to the provider 604. The service request 606 may be, for example, a request for a VN such as the VN 104 of FIG. 1. In an embodiment, the service request 606 indicates or identifies a base level of service at a base cost and one or more one or more negotiated levels of service each at a negotiated cost. The base level of service may be a minimum level of service, a desired level of service, or some other metric for the service. By way of example, and as will be more fully explained below, the base level of service may indicate that the requested service must have a latency of less than one millisecond (1 ms) at a base cost of one (1). In an embodiment, the base cost represents a monetary cost such as a cost in dollars.

Each of the negotiated levels of service includes a negotiated service parameter that has been downgraded or relaxed relative to a corresponding base level service parameter. In addition, each negotiated cost is less than the base cost for the base level of service. By way of example, and as will be more fully explained below, the negotiated levels of service may indicate that the service can be provided at a latency of less than two milliseconds (2 ms) at a cost of 0.9, at a latency of less than three milliseconds (3 ms) at a cost of 0.8, or at a latency of less than five milliseconds (5 ms)

at a cost of 0.5. In an embodiment, the base level of service and the negotiated levels of service are determined by the customer 602.

Upon receiving the service request 606, the provider 604 makes a determination of whether the base level of service or one of the negotiated levels of service in the service request 606 can be satisfied based on the network resources currently available. For example, the provider 604 assesses, polls, or otherwise checks the network resources (e.g., the child controllers 112, 114, 116, ingress network elements 118, egress network elements 120, and intermediate network elements 122, etc., in FIG. 1) to determine whether the base level of service or one of the negotiated levels of service in the service request 606 can be achieved.

When the base level of service is available, the provider 604 transmits a confirmation message 608 to the customer device 602 to accept the service request 606. Thereafter, the service is established for the customer 602 in accordance with the confirmation message 608 (e.g., at the base level or higher). When the base level of service is not available, the provider 604 transmits a confirmation message 610 to the customer 602 device. In an embodiment, the confirmation message 610 indicates that one of negotiated levels of service has been accepted by the provider 604 when the base level of service is not available. For example, the confirmation message 610 may indicate that a service having a latency of less than two milliseconds (2 ms) has been selected. Thereafter, the service is established for the customer 602 in accordance with the confirmation message 610 (e.g., at the negotiated level that was selected and for the negotiated cost).

In an embodiment, the negotiation model 500, 600 of FIGS. 5-6 may be repeated for each subsequent service request that commences a new transaction. For example, the negotiation model 500, 600 may be repeated when a customer desires to stream media using a VN similar to VN 104 in FIG. 1, repeated again when the customer 502, 602 desires upload a video to a video server, repeated again when the customer 502, 602 decides to use a social media application, and so on. Thus, a renegotiation regarding use of either the base level of service or one of negotiated levels of service may take place for each subsequent service request that commences a new transaction. This allows for, for example, different parameters to be used for the different transactions. To put that in context, a base level of service with a high bandwidth may be negotiated to stream the media, while a negotiated level of service with a lower bandwidth may be negotiated for use of the social media application.

FIG. 7 is an embodiment of a service listing 700 that may be used within the provider-initiated negotiation model 500 of FIG. 5 or within the customer-initiated negotiation model 600 of FIG. 6. The service listing 700 includes a base level of service 702, a first negotiated level of service 704, and a second negotiated level of service 706. Although two negotiated levels of service are illustrated in FIG. 7, it should be understood that any number of negotiated levels of service may be included in the service listing 700 in practical applications.

As shown, the base level of service 702, the first negotiated level of service 704, and the second negotiated level of service 706 each contain one or more service parameters 708. By way of example, the service parameters 708 may include a latency parameter, a latency variation parameter, a reserved bandwidth parameter, and a protection parameter. Other service parameters 708 may be utilized in practical applications.

The base level of service 702 in FIG. 7 indicates that an acceptable latency is less than or equal to a first time (t1), the latency variation is less than or equal to a first time delta (dt1), the reserved bandwidth is a base level bandwidth (B0), the protection is one level of redundancy (1+1), and the cost is one unit (1).

In an embodiment, the first time may be an average latency time and may be expressed as a unit of time such as microseconds, milliseconds, and so on. In an embodiment, the latency variation represents a maximum deviation allowed. For example, the latency deviation cannot be more than fifteen milliseconds (15 ms) even if the average latency time of one millisecond (1 ms) can be achieved during the service. In an embodiment, the reserved bandwidth is a minimum amount of bandwidth that must be provided or guaranteed. The reserved bandwidth may be represented in bits per second or some other rate of data transfer. In an embodiment, the protection is one default path for data transfer plus one disjoint path that may be used in case there is a failure along the default path. The cost may be represented in United States dollars ($1) and may be the amount that the customer will be billed per unit of data, amount of time the service is used, and so on.

The first negotiated level of service 704 in FIG. 7 indicates that an acceptable latency is less than or equal to the total of a first time (t1) and a second time (t2), the latency variation is less than or equal to a first time delta (dt1), the reserved bandwidth is a base level bandwidth (B0), the protection is one level of redundancy (1+1), and the cost is nine tenths of one unit (0.9). The second negotiated level of service 706 in FIG. 7 indicates that an acceptable latency is less than or equal to the total of a first time (t1), a second time (t2), and a third time (t3), the latency variation is less than or equal to the total of a first time delta (dt1) and a second time delta (t2), the reserved bandwidth is a base level bandwidth (B0), the protection is one level of redundancy (1+1), and the cost is eight tenths of one unit (0.8).

From the foregoing, it should be appreciated that the service listing 700 presents an example where latency and latency variation may be downgraded or relaxed while the reserved bandwidth and the protection level cannot. Moreover, FIG. 7 illustrates that the relative cost for downgraded or relaxed service decreases.

FIG. 8 is an embodiment of a service listing 800 that may be used within the provider-initiated negotiation model 500 of FIG. 5 or within the customer-initiated negotiation model 600 of FIG. 6. The service listing 800 in FIG. 8 is similar to the service listing 700 in FIG. 7. The service listing 800 includes a base level of service 802, a first negotiated level of service 804, and a second negotiated level of service 806. Although two negotiated levels of service are illustrated in FIG. 8, it should be understood that any number of negotiated levels of service may be included in the service listing 800 in practical applications.

As shown, the base level of service 802, the first negotiated level of service 804, and the second negotiated level of service 806 each contain one or more service parameters 808. By way of example, the service parameters 808 may include a latency parameter, a latency variation parameter, a reserved bandwidth parameter, and a protection parameter. Other service parameters 808 may be utilized in practical applications.

The base level of service 802 in FIG. 8 indicates that an acceptable latency is less than or equal to a first time (t1), the latency variation is less than or equal to a first time delta (dt1), the reserved bandwidth is a base level bandwidth (B0), the protection is one level of redundancy (1+1), and the cost is one unit (1). The first negotiated level of service 804 in FIG. 8 indicates that an acceptable latency is less than or equal to the first time (t1), the latency variation is less than or equal to the first time delta (dt1), the reserved bandwidth is a base level bandwidth (B0) less a first level bandwidth (B1), the protection is one level of redundancy (1+1), and the cost is seven tenths of one unit (0.7). The second negotiated level of service 806 in FIG. 8 indicates that an acceptable latency is less than or equal to the first time (t1), the latency variation is less than or equal to the first time delta (dt1), the reserved bandwidth is a base level bandwidth (B0) less the first level bandwidth (B1) and less the second level bandwidth (B2), the protection is one level of redundancy (1+1), and the cost is five tenths of one unit (0.5).

From the foregoing, it should be appreciated that the service listing 800 presents an example where latency and latency variation remain constant among the different levels while the reserved bandwidth is downgraded or relaxed relative to the base level 802. Moreover, FIG. 8 illustrates that the relative cost for downgraded or relaxed service decreases.

Figure 9:
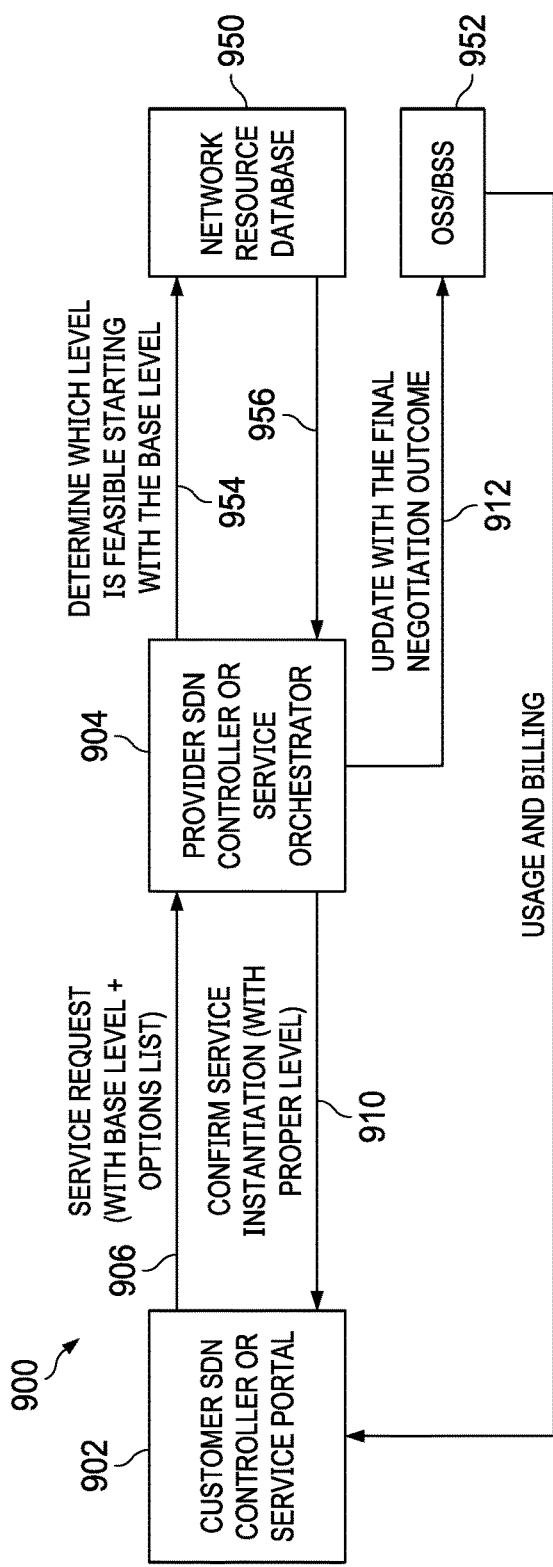
FIG. 9 is an embodiment of an implementation process flow.

FIG. 9 is an embodiment of an implementation process flow 900. The implementation process flow 900 includes a customer 902, a provider 904, a network resource database 950, and a billing server 952. The customer 904 and the provider 904 are similar to the customer 502, 602 and the provider 504, 604 in FIGS. 5-6. In an embodiment, the billing server 952 comprises an operating support system (OSS) and/or a billing support system (BSS).

The implementation process flow 900 of FIG. 9 depicts negotiation of services based on a customer-initiated negotiation model similar to the customer-initiated negotiation model 600 of FIG. 6. Even so, it should be recognized that the implementation process flow 900 of FIG. 9 may be adapted to accommodate a provider-initiated negotiation model similar to the provider-initiated negotiation model 500 of FIG. 5.

As shown, the customer 902 transmits a service request 906 to the provider 904. The service request 906 may be, for example, a request for a VN such as the VN 104 of FIG. 1. In an embodiment, the service request 906 indicates or identifies a base level of service at a base cost and one or more one or more negotiated levels of service each at a negotiated cost. Each of the negotiated levels of service includes a negotiated service parameter that has been downgraded or relaxed relative to a corresponding base level service parameter.

Upon receiving the service request 906, the provider 904 sends a message 954 to the network resource database 950 to determine what level of service is available from the network resources (e.g., the child controllers 112, 114, 116, ingress network elements 118, egress network elements 120, and intermediate network elements 122, etc., in FIG. 1) to determine whether the base level of service or one of the negotiated levels of service in the service request 606 can be achieved.

The provider 904 receives a reply 956 from the network resource database 950 in response to the message 954. The reply 956 indicates the level of service that is currently available from the network resources. After receiving the reply 956, the provider 904 transmits a confirmation message 910 to the customer 902. The confirmation message 910 confirms service instantiation with the level of service identified by the network resource database 950.

In order to ensure that the customer 902 is appropriately billed for the instantiated service, the provider 904 transmits an outcome message 912 to the billing server 952. In an embodiment, the outcome message 912 indicates whether the customer device will receive or is receiving the base level of service or one of the negotiated levels of service. In an embodiment, the billing server 952 transmits a billing notification message 914 to the customer 902. The billing notification message 914 may contain, for example, an indication of whether the customer 902 device is being billed for the base level of service or one of the negotiated levels of service. The billing notification message 914 may also include other information such as how much of the service the customer 902 has used, peak usage times and amounts, and so on.

Figure 10:
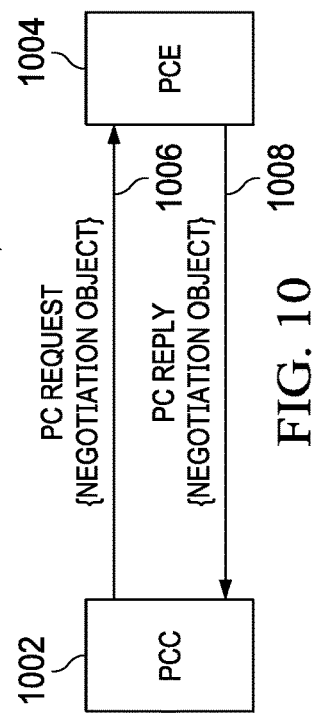
FIG. 10 is an embodiment of a services negotiation process in a path computational element protocol (PCEP) implementation.

FIG. 10 is an embodiment of a services negotiation process 1000 in a PCEP implementation. The services negotiation process 1000 includes a path computation client (PCC) 1002 and a PCE 1004. In an embodiment, the PCC 1002 is similar to the customer 602 of FIG. 6 and the PCE 1004 is similar to the provider 604 of FIG. 6. As shown, the PCC 1002 transmits a PCRequest message 1006 to the PCE 1004. In an embodiment, the PCRequest message 1006 has the following syntax:

---

<PCReq Message> ::= <Common Header [<svec-list>] <request-list>
where <request-list>::=<request> [<request-list>]
<request>::= <RP> <ENDPOINTS> [ <Negotiation> ] [other optional objects...]

---

In an embodiment, the <RP> object is configured to contain a negotiation flag. When the negotiation flag is set (e.g., has a non-zero value), the PCRequest message 1006 contains the <Negotiation> object. When the negotiation flag is not set (e.g., has a value of zero), the PCRequest message 1006 does not contain the <Negotiation> object.

In an embodiment, the <Negotiation> object contains a listing of the available levels of service (e.g., a base level and one or more negotiated levels) along with their corresponding costs. When the PCRequest message 1006 with a negotiation flag that is set is received, the PCE 1004 parses the <Negotiation> object to determine the available levels of service. As shown, the PCE 1004 transmits a PCReply message 1008 to the PCC 1002. In an embodiment, the PCReply message 1008 will include the <Negotiation> object to indicate which of the available levels of service has been selected by the PCE 1004.

Figure 11:
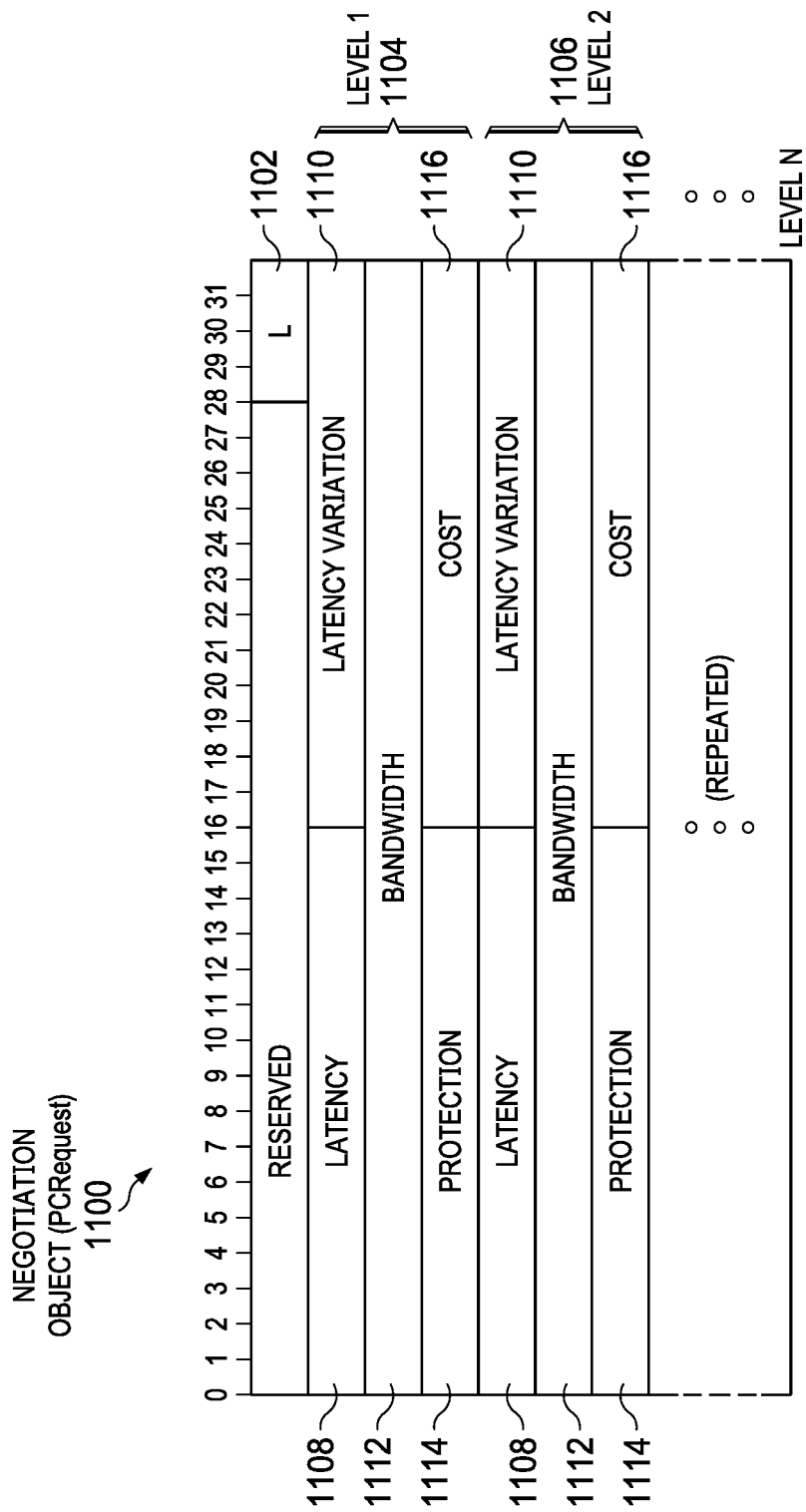
FIG. 11 is an embodiment of a <Negotiation> object that may be included in a PCRequest.

FIG. 11 is an embodiment of a <Negotiation> object 1100 that may be included in a PCRequest such as the PCRequest 1006 of FIG. 10. In an embodiment, the <Negotiation> object 1100 includes a negotiation flag field 1102 configured to contain a negotiation flag. The negotiation flag field 1102 may comprise 2 bits. In an embodiment, the negotiation flag field 1102 contains a value represented by the letter "L" in FIG. 11, which signifies the number of levels of service contained in the PCRequest 1006. For example, when the negotiation flag field 1102 contains the value of "3" then the PCRequest 1006 contains three levels of service (e.g., the base level of service 702, the first negotiated level of service 704, and the second negotiated level of service 706 of FIG. 7). Up to "N" levels of service can be identified using the negotiation flag field 1102. In an embodiment, up to 16 levels of service can be identified.

As shown in FIG. 11, in an embodiment <Negotiation> object 1100 contains a first level of service 1104, which is labeled Level 1, and a second level of service 1106, which is labeled Level 2. Level 1 may represent the base level of service and Level 2 may represent the negotiated level of service. As shown, the first and second levels of service 1104, 1106 each contain various fields corresponding to various service parameters (e.g., the service parameters 708 of FIG. 7). For example, the first and second levels of service 1104, 1106 contain a latency field 1108, a latency variation field 1110, a bandwidth field 1112, a protection field 1114, and a cost field 1116. Each of the latency field 1108, the latency variation field 1110, the bandwidth field 1112, the protection field 1114, and the cost field 1116 may contain a value indicating the particular service parameter for that field as discussed in connection with FIG. 7. Despite the configuration of FIG. 11, it should be recognized that other fields may be utilized in the <Negotiation> object 1100 in practical applications.

Figure 12:
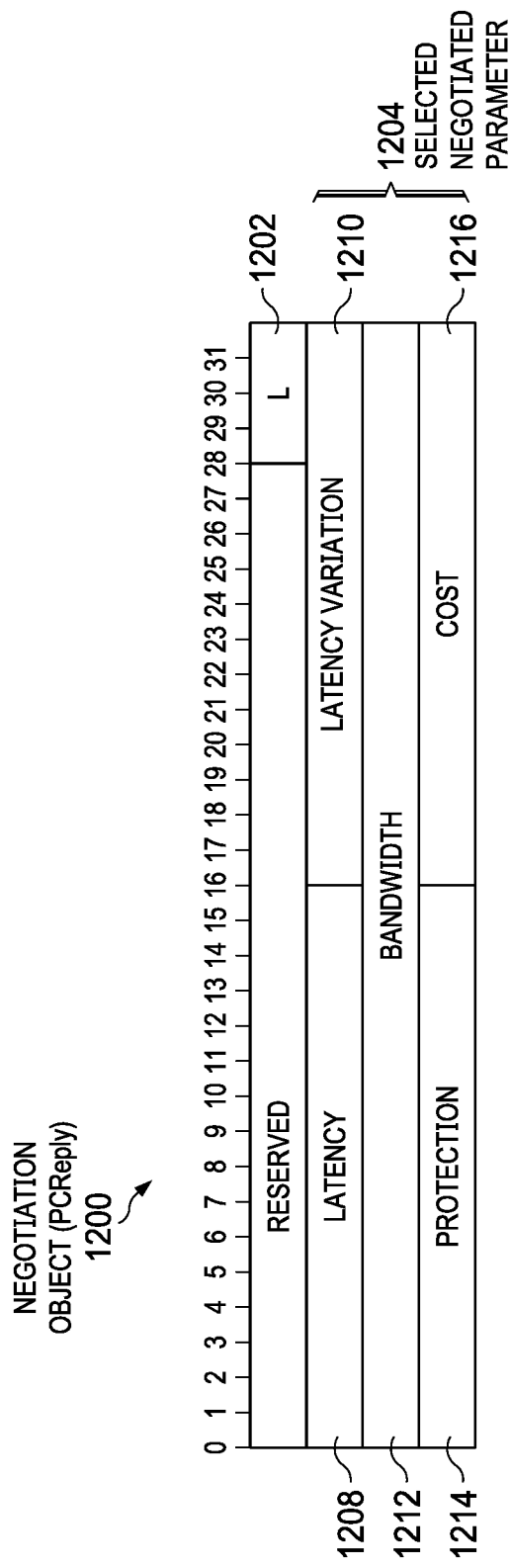
FIG. 12 is an embodiment of a <Negotiation> object that may be included in a PCReply.

FIG. 12 is an embodiment of a <Negotiation> object 1200 that may be included in a PCReply such as the PCReply 1008 of FIG. 10. In an embodiment, the <Negotiation> object 1200 includes a negotiation flag field 1202 configured to contain a negotiation flag. The negotiation flag field 1202 may comprise 2 bits. In an embodiment, the negotiation flag field 1202 contains a value represented by the letter "L" in FIG. 12, which signifies the number of level of service that was selected. For example, when the negotiation flag field 1202 contains the value of "5" in the PCReply 1008 the fifth available level of service was selected.

As shown in FIG. 12, in an embodiment <Negotiation> object 1200 contains the selected level of service 1204. As shown, the selected level of service 1204 contains various fields corresponding to various service parameters (e.g., the service parameters 708 of FIG. 7). For example, the selected level of service 1204 contains a latency field 1208, a latency variation field 1210, a bandwidth field 1212, a protection field 1214, and a cost field 1216. Each of the latency field 1208, the latency variation field 1210, the bandwidth field 1212, the protection field 1214, and the cost field 1216 may contain a value indicating the particular service parameter for that field as discussed in connection with FIG. 7. Despite the configuration of FIG. 12, it should be recognized that other fields may be utilized in the <Negotiation> object 1200 in practical applications.

Figure 13:
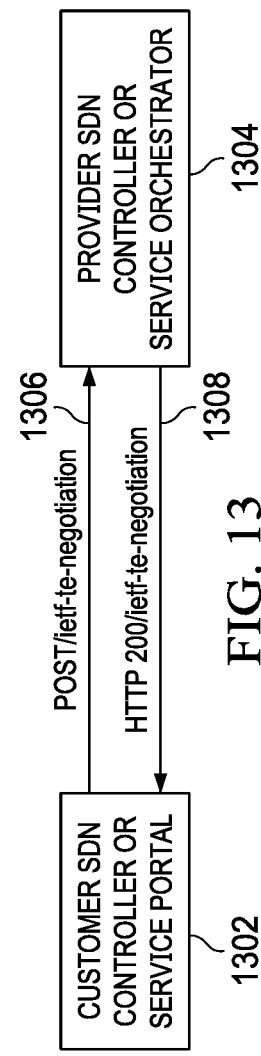
FIG. 13 is an embodiment of a services negotiation process in a RestConf/Yang implementation.

FIG. 13 is an embodiment of a services negotiation process 1300 in a RestConf/Yang implementation utilizing the RestConf protocol and Yang data modeling. The RestConf protocol is described in the IETF document entitled, "RESTCONF Protocol," published January 2017, which is incorporated herein by reference as if reproduced in its entirety. The Yang data model language is described in the IETF RFC 6020 document entitled, "YANG—A Data Modeling Language for the Network Configuration Protocol (NETCONF)," published October 2010, which is incorporated herein by reference as if reproduced in its entirety.

The services negotiation process 1300 includes a customer SDN controller 1302 and a provider SDN controller 1304. The customer SDN controller 1302 may be referred to as a service portal, and the provider SDN controller 1304 may be referred to as a service orchestrator. In an embodiment, the customer SDN controller 1302 is similar to the customer 602 of FIG. 6 and the provider SDN controller 1304 is similar to the provider 604 of FIG. 6. As shown, the customer SDN controller 1302 transmits a POST message 1306 to the provider SDN controller 1304.

The POST message 1306 indicates, for example, the base level of service and the one or more negotiated levels of service that may be selected by the provider SDN controller 1304. In an embodiment, the POST message 1306 has the following syntax:

```
module: ietf-te-negotiation
  +--rw negotiation
  |  +--rw negotiation-list* [negotiation-level-id]
  |     +--rw negotiation-level-id   uint32
  |     +--rw latency?               uint32
  |     +--rw latency-variation?     uint32
  |     +--rw bandwidth?             unit32
  |     +--rw protection-level?      protection-type
  |     +--rw cost?                  unit32
```

Once either the base level of service or one of the negotiated levels of service has been selected by the provider SDN controller 1304, the provider SDN controller 1304 transmits a Hypertext Transfer Protocol (HTTP) 200 message 1308 to the customer SDN controller 1302. In an embodiment, the HTTP 200 message 1308 has the following syntax:

```
+--ro negotiation-selection
   +--ro negotiation-level-id?   uint32
   +--ro latency?                uint32
   +--ro latency-variation?      uint32
   +--ro bandwidth?              unit32
   +--ro protection-level?       protection-type
   +--ro cost?                   unit32
```

In an embodiment, the services negotiation process 1300 employs the Yang model 1400 depicted collectively in FIGS. 14A-C. In an embodiment, the services negotiation process 1300 is adapted for the NetConf protocol. The NetConf protocol is described in the IETF document entitled, "Network Configuration Protocol (NETCONF)," published June 2011, which is incorporated herein by reference as if reproduced in its entirety.

FIG. 15 is a flowchart of an embodiment of a method 1500 of negotiating services. The method 1500 is implemented by a customer device, such as the customer 602 of FIG. 6. The method 1500 is implemented when the customer seeks to establish a service such as the VN 104 of FIG. 1. At step 1502, a service request is transmitted to a provider device such as provider 504 of FIG. 5. In an embodiment, the service request includes a base level of service at a base cost and one or more negotiated levels of service each at a negotiated cost. Each of the one or more negotiated levels of service includes a negotiated service parameter that has been downgraded relative to a corresponding base level service parameter. Also, the negotiated cost is less than the base cost.

At step 1504, a confirmation message is received from the provider device in response to the service request. In an embodiment, the confirmation message indicates that the base level of service has been accepted by the provider device when the base level of service is available. When the base level of service is not available, the confirmation message indicates that one of the negotiated levels of service has been accepted by the provider device. At step 1506, data is received at the base level of service or at the negotiated level of service in accordance with the confirmation message.

FIG. 16 is a flowchart of an embodiment of a method 1600 of negotiating services. The method 1600 is implemented by a provider device, such as the provider 504 of FIG. 5. The method 1600 is implemented when the customer device, such as customer 502, seeks to establish a service such as the VN 104 of FIG. 1. At step 1602, a service request is received from a customer device. In an embodiment, the service request includes a base level of service. At step 1604, a confirmation message is transmitted to the customer device to accept the service request when the base level of service is available.

At step 1606, a negotiation request is transmitted to the customer device when the base level of service is not available. In an embodiment, the negotiation request includes one or more negotiated levels of service each having a negotiated cost. Each of the negotiated levels of service includes a negotiated service parameter that has been downgraded relative to a corresponding base level service parameter. Each negotiated cost is less than a base cost for the base level of service.

At step 1608, a modified service request is received from the customer device in response to the negotiation request. In an embodiment, the modified service request contains a selection of one of the negotiated levels of service. At step 1610, a modified confirmation message is transmitted to the customer device to accept the modified service request. At step 1612, the base level of service is provided to the customer device when the base level of service is available and one of the negotiated levels of service is provided to the customer device according to the selection when the base level of service is not available.

FIG. 17 is a schematic diagram of a network device 1700 according to an embodiment of the disclosure. The network device 1700 is suitable for implementing the disclosed embodiments as described herein. In an embodiment, the network device 1700 may be the customer 502, 602 or the provider 504, 604 of FIGS. 5-6. In an embodiment, the network device 1700 may be any of the various network elements (e.g., central controller 110, child controllers 112, 114, 116, ingress network elements 118, egress network elements 120, and intermediate network elements 122, CNC 202, etc.) in FIGS. 1-2.

The network device 1700 comprises ingress ports 1710 and receiver units (Rx) 1720 for receiving data; a processor, logic unit, or central processing unit (CPU) 1730 to process the data; transmitter units (Tx) 1740 and egress ports 1750 for transmitting the data; and a memory 1760 for storing the data. The network device 1700 may also comprise optical-to-electrical (OE) components and electrical-to-optical (EO) components coupled to the ingress ports 1710, the receiver units 1720, the transmitter units 1740, and the egress ports 1750 for egress or ingress of optical or electrical signals.

The processor 1730 is implemented by hardware and software. The processor 1730 may be implemented as one or more CPU chips, cores (e.g., as a multi-core processor), field-programmable gate arrays (FPGAs), application specific integrated circuits (ASICs), and digital signal processors (DSPs). The processor 1730 is in communication with the ingress ports 1710, receiver units 1720, transmitter units 1740, egress ports 1750, and memory 1760. The processor 1730 comprises a negotiation module 1770. The negotiation module 1770 implements the disclosed embodiments described above. The inclusion of the negotiation module 1770 therefore provides a substantial improvement to the functionality of the network device 1700 and effects a transformation of the network device 1700 to a different state. Alternatively, the negotiation module 1770 is implemented as instructions stored in the memory 1760 and executed by the processor 1730.

The memory 1760 comprises one or more disks, tape drives, and solid-state drives and may be used as an overflow data storage device, to store programs when such programs are selected for execution, and to store instructions and data that are read during program execution. The memory 1760 may be volatile and/or non-volatile and may be read-only memory (ROM), random access memory (RAM), ternary content-addressable memory (TCAM), and/or static random-access memory (SRAM).

Figure 18:
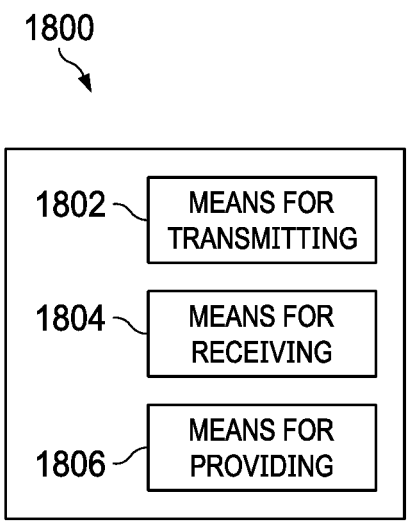
FIG. 18 is an embodiment of a method of negotiating services implemented by a customer device.

A method of negotiating services implemented by a customer device 1800 as shown in FIG. 18. The method transmitting, by means for transmitting 1802, a service request to a provider device, wherein the service request includes a base level of service at a base cost and one or more negotiated levels of service each at a negotiated cost, wherein each of the one or more negotiated levels of service includes a negotiated service parameter that has been downgraded relative to a corresponding base level service parameter, and wherein the negotiated cost is less than the base cost, receiving, by means for receiving 1804, a confirmation message from the provider device in response to the service request, wherein the confirmation message indicates that the base level of service has been accepted by the provider device when the base level of service is available, and wherein the confirmation message indicates that one of the one or more negotiated levels of service has been accepted by the provider device when the base level of service is not available, and receiving, by means for receiving data 1806, at the base level of service or at the one of the one or more negotiated levels of service in accordance with the confirmation message.

Figure 19:
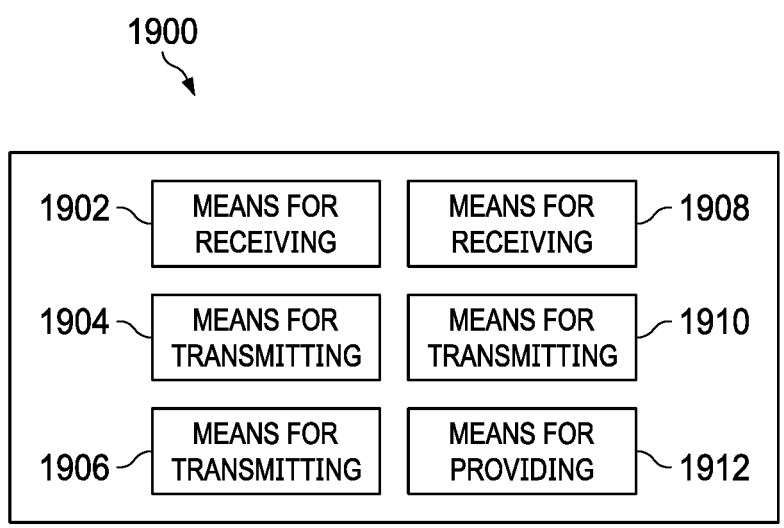
FIG. 19 is an embodiment of a method of negotiating services implemented by a provider device.

A method of negotiating services implemented by a provider device 1900 as shown in FIG. 19. The method includes receiving, by means for receiving 1902, a service request from a customer device, wherein the service request includes a base level of service, transmitting, by means for transmitting 1904, a confirmation message to the customer device to accept the service request when the base level of service is available, transmitting, by means for transmitting 1906, a negotiation request to the customer device when the base level of service is not available, wherein the negotiation request includes one or more negotiated levels of service each having a negotiated cost, wherein each of the negotiated levels of service includes a negotiated service parameter that has been downgraded relative to a corresponding base level service parameter, and wherein each negotiated cost is less than a base cost for the base level of service, receiving, by means for receiving 1908, a modified service request from the customer device in response to the negotiation request, wherein the modified service request contains a selection of one of the negotiated levels of service, transmitting, by means for transmitting 1910, a modified confirmation message to the customer device to accept the modified service request, and providing, by means for providing 1912, the base level of service to the customer device when the base level of service is available and providing the one of the negotiated levels of service to the customer device according to the selection when the base level of service is not available.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of negotiating services implemented by a customer device, comprising:
   transmitting a service request to a provider device, wherein the service request includes a base level of service at a base cost and one or more alternative levels of service each at an alternative cost, wherein each of the one or more alternative levels of service includes an alternative service parameter that has been downgraded relative to a corresponding base level service parameter, wherein the alternative cost is less than the base cost, and wherein the one or more alternative levels of service and the alternative cost for each are determined by the customer device;
   receiving a confirmation message from the provider device in response to the service request, wherein the confirmation message indicates that the base level of service has been accepted by the provider device when the base level of service is available, and wherein the confirmation message indicates that one of the one or more alternative levels of service has been accepted by the provider device when the base level of service is not available; and
   receiving data at the base level of service or at the one of the one or more alternative levels of service in accordance with the confirmation message.

2. The method of claim 1, further comprising renegotiating use of the base level of service or the one of the one or more alternative levels of service for each subsequent service request that commences a new transaction.

3. The method of claim 1, wherein the base level of service and the one or more alternative levels of service include one or more of a latency parameter, a latency variation parameter, a reserved bandwidth parameter, and a protection parameter.

4. The method of claim 1, wherein the service request and the confirmation message conform to one of a Path Computation Element (PCE) Communication Protocol (PCEP).

5. The method of claim 1, wherein the service request and the confirmation message conform to a RestConf protocol or a NetConf protocol.

6. The method of claim 1, wherein a negotiation level flag in the service request indicates how many of the one or more alternative levels of service are available to be accepted.

7. The method of claim 1, wherein a negotiation level flag in the confirmation message indicates which of the one or more alternative levels of service has been accepted by the provider device.

8. The method of claim 1, further comprising receiving a billing notification message from a billing server, wherein the billing notification message indicates whether the customer device is being billed for the base level of service or the one of the one or more alternative levels of service.

9. A customer device comprising memory storing instructions and a processor that executes the instructions to cause the customer device to:
   transmit a service request to a provider device, wherein the service request includes a base level of service at a base cost and a plurality of alternative levels of service each having an alternative cost, wherein each of the alternative levels of service includes an alternative service parameter that has been downgraded relative to a corresponding base level service parameter, wherein the alternative cost is less than the base cost, and wherein the alternative levels of service and the alternative cost are determined by the customer device;
   receive a confirmation message from the provider device in response to the service request, wherein the confirmation message indicates that the base level of service has been accepted by the provider device when the base level of service is available, and wherein the confirmation message indicates that one of the alternative levels of service has been accepted by the provider device when the base level of service is not available but the one of the alternative levels of service is available; and
   process data received by the customer device at the base level of service or at the one of the alternative levels of service in accordance with the confirmation message.

10. The customer device of claim 9, wherein a negotiation level flag in the confirmation message indicates which of the plurality of alternative levels of service has been selected by the provider device.

11. The customer device of claim 9, wherein the confirmation message includes the alternative service parameter.

* * * * *